July 9, 1946.    A. W. HATFIELD    2,403,859
TESTING DEVICE
Filed Aug. 26, 1944    2 Sheets-Sheet 1
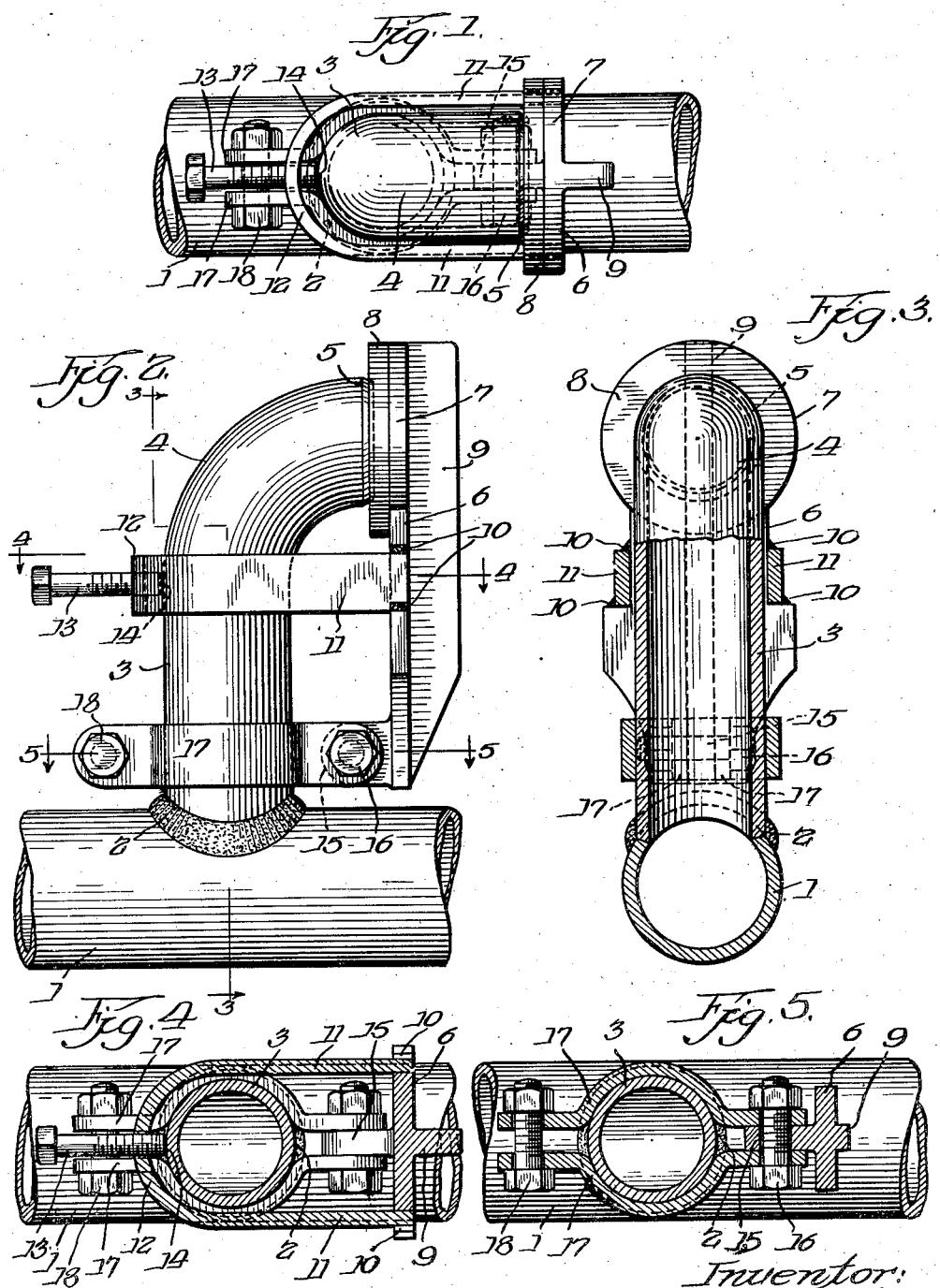

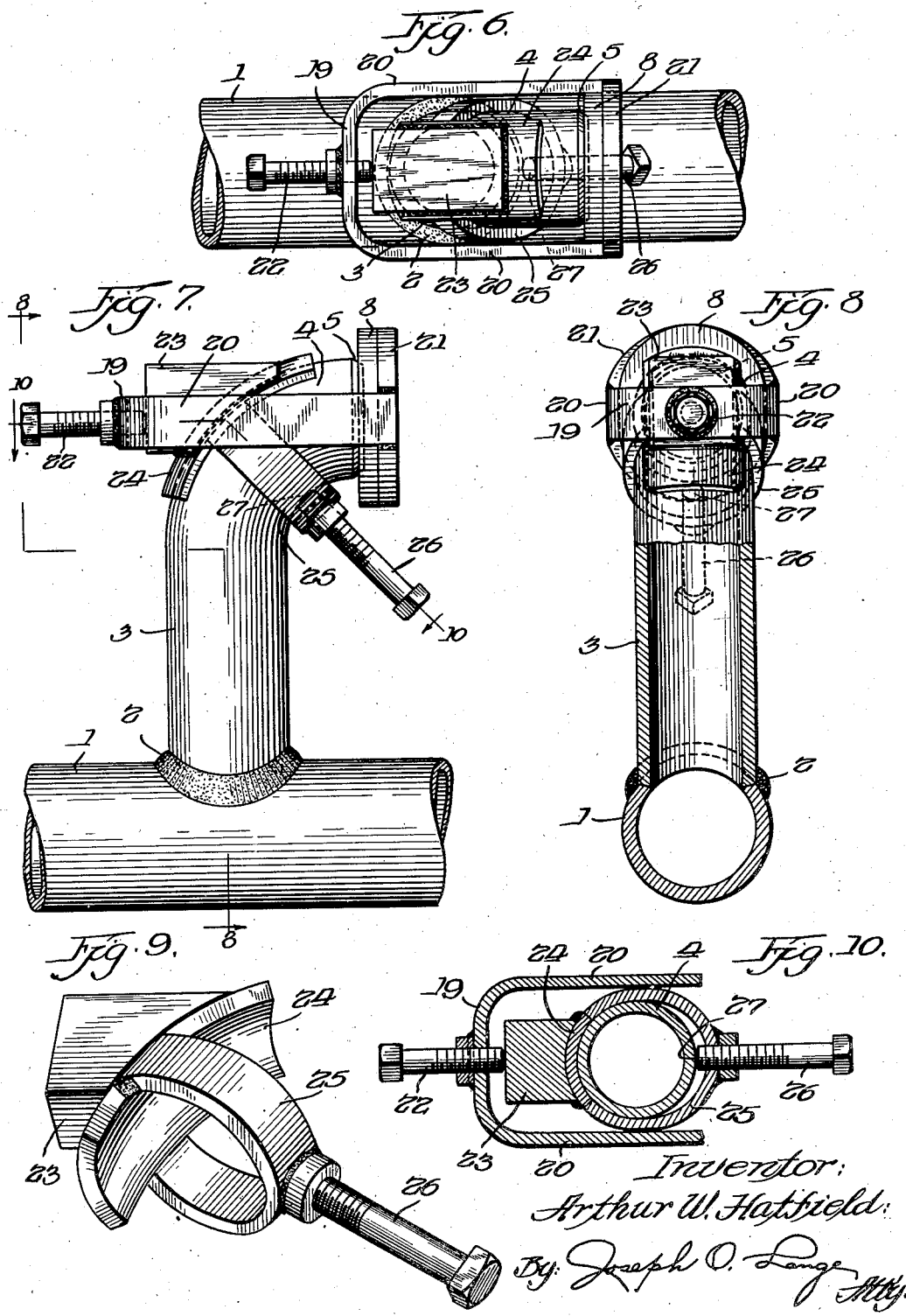

Patented July 9, 1946

2,403,859

UNITED STATES PATENT OFFICE 2,403,859

TESTING DEVICE

Arthur W. Hatfield, Chicago, Ill., assignor to Crane Co., Chicago, Ill., a corporation of Illinois Application August 26, 1944, Serial No. 551,387

3 Claims. (Cl. 138—90)

This invention relates generally to testing devices. More particularly, it pertains to a novel testing clamp, for use in testing headers, L's T's, crosses, and other side outlet fittings usually provided with welding ends or with similar plain end connections and angularly arranged outlets, in which no flange, bead or threaded end is employed for the attachment of a test closure or the like but in which a simple plain end generally suitable for welding is used to make the connection with the pipe or tubing.

To gain a true appreciation of the background of this inventive contribution, it should be understood at the outset that it has long been a problem to be able to obtain a pressure tight joint quickly, safely and conveniently without considerable expense when testing these types of fittings by the application of internal fluid pressures. In the latter connection for example it has heretofore been the accepted practice to weld a cup or a plug on such end of the fitting or header to make it suitable for retaining the test pressure. After the test has been completed it has previously been necessary either to saw or otherwise remove a welded cap, or closure, then re-form and re-new the welded end connection from which the cap has been removed to constitute the completed fitting ready for shipment by the manufacturer. This practice has necessarily been relatively expensive and has led to objectionable delays in the course of manufacture of the header or the fitting. The fitting or header during such handling has also been damaged frequently, thus requiring further special attention.

With the foregoing in mind it will become more clearly apparent that a means has been devised whereby such pressure retaining connection as above referred to may now be made without the requirement of any special skill or handling on the part of the operator and without in any way marring or interfering with the original welded end connection on the fitting as completed by the manufacturer.

The novel welding clamp constituting this invention may be not only easily applied and removed but it may also be made very cheaply to include a wide variety of shapes and sizes to suit the many types of headers and pipe fittings. At the same time the device is sufficiently sturdy so that by actual test it has been found to be able to resist successfully internal pressure loads of a relatively high order, as for example as much as 1250 lbs. internal pressure without signs of failure.

Another advantage in this construction lies in the fact that a cheap and easily accessible sheet gasket may be employed and conveniently renewed when necessary, while the novel clamp itself may be made economically from sheets or strips of metal suitably welded to form the final assembly of the clamping device.

Other important objects and advantages will become more readily apparent upon proceeding with the specification read in light of the accompanying drawings in which Fig. 1 is a plan assembly view of a preferred embodiment of my invention.

Fig. 2 is a side view of the exterior of the device referred to in Fig. 1.

Fig. 3 is a sectional view taken on the line 3—3 of Fig. 2.

Fig. 4 is a sectional view taken on the line 4—4 of Fig. 2.

Fig. 5 is a sectional view taken on the line 5—5 of Fig. 2.

Fig. 6 is a plan view of a modified form of the invention.

Fig. 7 is a side view of the modified form described in connection with Fig. 6.

Fig. 8 is a sectional view taken on the line 8—8 of Fig. 7.

Fig. 9 is a perspective view of a novel form of saddle employed in the modified form referred to in Fig. 6.

Fig. 10 is a sectional view taken on the line 10—10 of Fig. 7.

Referring now to Fig. 1 in which merely for purpose of illustration for the application of my invention a fragmentary portion of a welded header 1 is shown having the weld 2 to which the side outlet 3 having the curved extension or elbow portion 4 for such welded connection as may be necessary to suit the purposes of the final installation. The end of the curved portion 4 is provided with the bevel surface 5 for effecting the final weld. As will hereinafter become apparent, the type of weld employed is not an essential element insofar as the application of this invention is concerned.

It should be understood that the shape of the header or similar fitting is frequently quite irregular and therefore requires special consideration after completion of its manufacture when it becomes necessary to test the same as a pressure containing vessel. Thus as will hereinafter become more readily apparent it is because of its great flexibility and relative convenience of manufacture that the clamp of my invention lends itself to being applied quickly and easily to the fitting, notwithstanding the irregularity of form of the fitting.

The test clamp of my invention is shown more clearly in Fig. 2, consisting essentially of a flat plate portion 6 having an enlarged end 7 as more clearly shown in Fig. 3 of sufficient size and shape to conveniently accommodate the end portion 5 of the elbow 4. Interposed between the ends of the fitting as at 5 and the plate 7 a suitable gasket 8 is used, thus serving as a sealing means between the plate 7 and the connection 5 of the fitting. It has been found preferable although not absolutely necessary that the plate portion 6 be stiffened by means of a longitudinally extending rib 9 which may be integral or welded thereto. Approximately midway of the length of the plate 6 a yoke 11 is attached preferably by welding or by any other suitable means to the plate 6. The yoke 11 is as shown more clearly in Fig. 1 of generally U configuration. At its closed or rounded end portion 12 a threaded set screw 13 is positioned for reasons hereinafter explained.

For the purpose of adding greater strength and security to the installation of my welding clamp it is preferable to provide for the plate 6 to be pivotally mounted with relation to the fitting 3. This is accomplished by having the lower end portion of the plate 6 provided as indicated at 15 with an apertured rib through which the bolt 16 extends for making a suitable connection with the split collar 17 encircling the neck portion of the fitting 3. The opposite end of the split collar is similarly held to the fitting 3 by means of the through bolt 18. Thus it becomes apparent that by the construction just described the bolt 16 serves as the pivotal point about which the plate 6 moves during the course of applying compression to the gasket 8 and also when the latter is released upon disassembly. Both the compressing of the gasket 8 as well as its release from such compression is accomplished by means of the set screw 13 being suitably rotated in the end portion 14 thereof bearing against the outside diameter of the straight portion of the fitting 3.

It is apparent that a simple and very effective means for applying a gasket to an irregular shaped fitting has been devised. The parts used in making this clamp do not require expensive accuracy in either the assembly or in machining the individual parts to be assembled, and yet by the nature of the construction employed substantial strength and rigidity has been obtained, it being able to resist the relatively high testing load applied to the fitting. The stiffening rib 9 while shown as an integral portion of the plate 6 may of course be suitably welded to the plate. Similarly, the manner of attachment of the U shaped yoke 11 as indicated by the weld 10 may be varied, depending upon the size and the shape of the fitting under consideration for test.

As indicated in the modified form illustrated in Figs. 6 to 10 inclusive, the face of the testing clamp above described may vary substantially without departing from the principles involved in obtaining a satisfactory structure.

Thus in a modified form about to be described the split collar 17 may be replaced by a saddle member preferably positioned at the crotch of the fitting to produce the same strength and rigidity of installation as described in connection with the previous figures.

In Fig. 7 showing the application of the modified form, the header 1 is provided with the usual welded end connection 2 and the extension 3 with the curved section 4, the beveled end 5 and the gasket 8 as previously described in connection with Fig. 2. However, in this embodiment the yoke member 19 of generally U shaped figuration is provided with the side legs or posts 20 as more clearly shown in Figs. 6 and 10. The end portion of the posts 20 are welded or otherwise connected to the flat plate 21. The latter plate member may be made as similarly described in connection with the plate 6 of such size and shape as to best suit the fitting with which the clamp is to be associated in testing. However, the detailed manner in which the U shaped yoke is applied to the fitting varies in this modification by the interposition of the saddle member 24 preferably having integral therewith the anvil portion 23, the saddle member being preferably hollowed out as indicated to fit the curved contour of the fitting under test. As shown in Fig. 9 the saddle member is of substantially circular cross section insofar as the yoke 25 is concerned and is provided with the set screw 26 threadedly engaged to bear against the crotch portion 27 of the elbow or other fittings under test, thus fixedly locating the anvil portion 23 relative to the fitting being tested.

From the foregoing it will be apparent that a novel clamp has been provided for effecting the quick and convenient attachment of a closure to a fitting under test and is accomplished without the necessity for the special shaping of the ends of the fitting to be tested nor making any permanent connections such as the prior use of welds.

It will be further apparent that the particular shape of the structure and the detailed relation of the parts may vary quite substantially throughout a wide range without departing from the principles hereinabove described. It is proposed therefore that the claims be not limited other than as necessitated by the state of the prior art.

I claim:

1. In a testing device of the character described, a saddle member having means for attachment to a fitting to be tested, a yoke member, the said saddle member having positioning means cooperating with said yoke member, the latter member having an end plate for positioning of a gasket between an annular end portion of the fitting to be tested and the said plate, the said saddle member and end plate being adjustably movable upon the fitting to be tested transversely relative to the annular end portion of the said fitting.

2. In a testing device for a pressure vessel of the character described, the combination including a plate member, the latter member having a ribbed longitudinally extending portion, a yoke member attached to the said plate member and extending transversely thereto, the said yoke providing for adjustable positioning of the said plate member transversely relative to an end portion of the pressure vessel, the plate member having at an opposite end portion pivotal means for independent connection with the article to be tested.

3. In a testing clamp for a plain end angle fitting, the combination including a plate member, a yoke attached to the said plate member, the said yoke providing for adjustable positioning of the said plate member, the plate member having at an end portion thereof means for pivotal connection with the fitting to be tested, the said latter means including a split collar pivotally attached to an end portion of the said plate member.

ARTHUR W. HATFIELD.